Nov. 15, 1966  E. S. BABSON  3,285,195
CONVEYOR SYSTEM CONTROL APPARATUS
Filed May 29, 1964  3 Sheets-Sheet 1

*Inventor*
Edward S. Babson
By his Attorney
Robert E. Ross

Nov. 15, 1966 — E. S. BABSON — 3,285,195
CONVEYOR SYSTEM CONTROL APPARATUS
Filed May 29, 1964 — 3 Sheets-Sheet 2

Nov. 15, 1966  E. S. BABSON  3,285,195
CONVEYOR SYSTEM CONTROL APPARATUS
Filed May 29, 1964  3 Sheets-Sheet 3

United States Patent Office 3,285,195
Patented Nov. 15, 1966

3,285,195
CONVEYOR SYSTEM CONTROL APPARATUS
Edward S. Babson, Ipswich, Mass., assignor to United Shoe Machinery Corporation, Flemington, N.J., a corporation of New Jersey
Filed May 29, 1964, Ser. No. 371,194
5 Claims. (Cl. 104—252)

This invention relates generally to conveyor systems of the type in which article carrying racks are moved between work stations by a conveyor or tow chain and has particular reference to a stop mechanism for arresting the movement of a rack in response to a predetermined signal.

In a copending application Serial No. 371,204, filed May 29, 1964 by Donald R. Skeffington there is disclosed a work handling system of the above described type in which individual racks are provided with a friction loaded sprocket for engagement with the tow chain, said sprocket being adapted to remain in engagement with the chain when the rack is arrested by a stop mechanism. A continuous forward force is consequently applied to the stop mechanism by the rack.

An object of this invention is to provide a novel stop mechanism for use with the conveyor system of the type in which article carrying racks are moved between work stations by a conveyor or tow chain.

A further object is to provide a stop member which has means responsive to the removal of an arrested rack from the stop position to permit said stop member to return to the pass position.

A further object of the invention is to provide a stop member in which the forward force applied by the rack drive mechanism of a rack arrested by the stop mechanism maintains the stop member in the stop position until the rack has been removed from operative relation to the chain.

Other objects of the invention will be apparent to one skilled in the art from the following description of a specific embodiment thereof.

Figure 1:
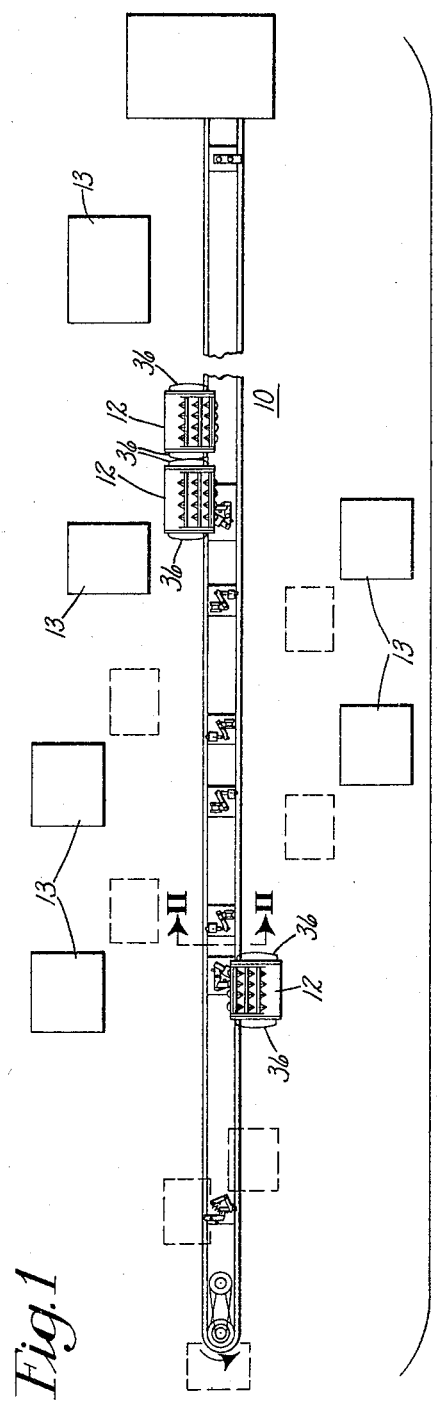
FIG. 1 is a schematic plan view of a conveyor system having stop members embodying the features of the invention.
Figure 2:
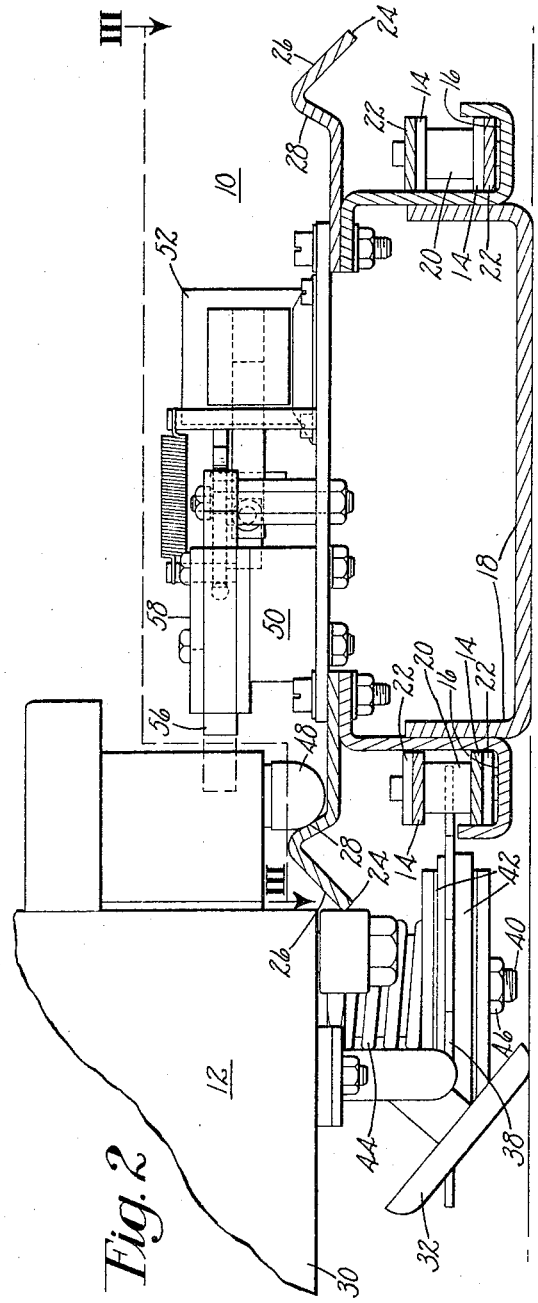
FIG. 2 is a view in section taken on line II—II of FIG. 1.

Referring to the drawing there is illustrated a drag line conveyor system comprising a floor mounted conveyor 10 which is adapted to convey article carrying devices such as racks 12 between various work stations 13. In the illustrated embodiment the conveyor 10 comprises an endless tow chain 14 which travels in a pair of spaced guide channels 16 disposed on opposite sides of a center housing 18. During normal operation of the system the chain is driven continuously in one direction which in the illustrated embodiment is in the direction of the arrows in FIGS. 1 and 3–5. The chain is of the type commonly known as roller chain and comprises a series of spaced vertical members 20 retained in position by upper and lower spacing plates 22. To provide means for retaining the rack in operative relation to the conveyor chain a cover 24 is disposed over each run of the chain, the outer edge of each of said covers having a downwardly sloping cam surface 26 leading to a shoulder portion 28 for a purpose to appear hereinafter.

The rack 12 comprises a base 30 having casters 32 mounted thereon to enable the rack to be moved freely in any direction. The rack may be provided with any convenient means for supporting the articles to be carried thereby. Disposed at each end of the rack is a spring bumper 36 to permit collision between adjoining racks without damage to the articles being carried.

To provide means for engagement with the conveyor chain, a drive sprocket 38 is mounted below the rack base on a suitable shaft 40. In the illustrated embodiment the drive sprocket is disposed between a pair of friction disks 42, said disks being non-rotatably disposed on the shaft 40 and being urged against the drive sprocket by means of a spring 44.

To provide means for releasably maintaining the rack in the proper position in relation to the chain 14 so that the sprocket 38 is engaged with the chain, a spring loaded detent 48 is mounted on the side of the rack adjacent the chain. The detent is positioned at an elevation such that when the rack is moved into operative relation to the conveyor by being pushed sideways toward the tow chain, the detent 48 cams itself up the surface 26 and snaps over the shoulder portion 28 of the chain cover 24.

During normal operation of the conveyor a rack to be transported thereby may be pushed against the conveyor in the manner described so that the sprocket 38 engages the continuously moving chain and is retained in operative relation thereto by the detent 48. Since the rack at this instant is stationary the drive sprocket will rotate momentarily at a rate corresponding to the chain speed, and as the force applied thereto by the chain accelerates the rack in the direction of chain motion, the rate of rotation of the sprocket will decrease substantially to zero. When the rack being conveyed reaches a stop mechanism, or collides with a previous rack or with some other obstruction, causing the rack to stop, the drive sprocket, which remains in engagement with the chain, commences to rotate at a speed corresponding to the chain speed. When the stop mechanism is released or the obstruction is removed the rack will again accelerate to the speed of the chain, with the sprocket rotation decreasing substantially to zero as the rack accelerates.

To control the movement of racks along the conveyor stop members of various types may be disposed in appropriate positions along the conveyor on the housing 18.

For use as a stop member at a work station the stop should be actuatable to the stop position by a predetermined signal from the work station, to arrest an oncoming rack and should return to the stop position automatically when the arrest rack has been removed from the conveyor by the operator at the work station.

For this purpose a stop member 50 may be provided at each work station. The stop 50 may be moved to the stop position by the energization of a solenoid 52 in response to the momentary closing of a switch (not shown) at the appropriate work station.

Figure 3:
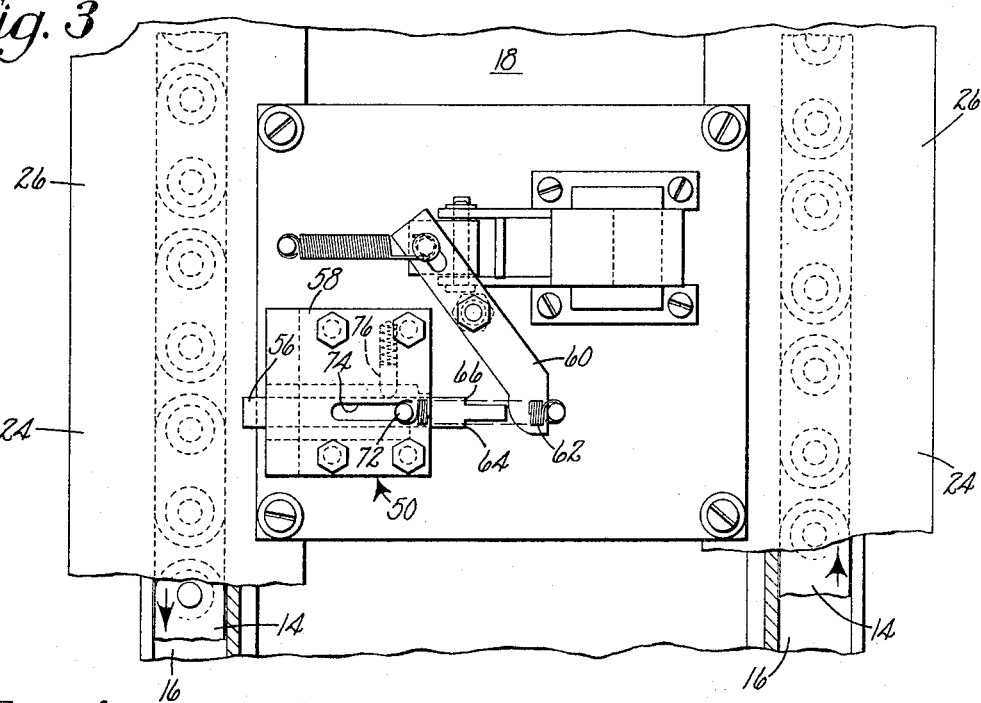
FIG. 3 is a view in section taken on line III—III of FIG. 2 illustrating the stop mechanism in the retracted or pass position.

The stop member 50 comprises an arm 56 movable longitudinally in a stop housing 58 between a stop position (see FIG. 4) in which the end of the arm projects into the path of a portion of the rack traveling in the conveyor, and a pass position, in which the end of the arm is retracted out of the path of the rack (see FIG. 3). In the illustrated embodiment the arm 56 is moved to the stop position by a lever 60 when the solenoid 52 is energized, and is returned to the pass position by a spring 62 after the arrested rack has been removed from the conveyor, in a manner to appear hereinafter.

To retain the arm 56 in the stop position after the momentary energization of the solenoid 52, and to cause the arm to return to the pass position when an arrested rack is removed from the stop position, the arm is provided with shoulders 64 and 66 near the inner end for cooperation with shoulders 68 and 70 inside the stop housing 58 as will appear hereinafter, and the arm is capable of a limited amount of pivotal movement about a pin 72 which extends from the upper surface of the arm into a guide slot 74 in the top of the stop housing.

When the solenoid 52 is momentarily energized, the lever 60 pushes the arm 56 outwardly so that the outer end projects into the path of the rack 12. As the arm moves to the outermost position, the arm is caused to pivot about the pin 72 by means of a spring-loaded plunger 76, whereby the shoulder 64 on the arm seats behind the shoulder 68 of the housing, so that the arm remains in a first stop position after de-energization of the solenoid.

Figure 4:
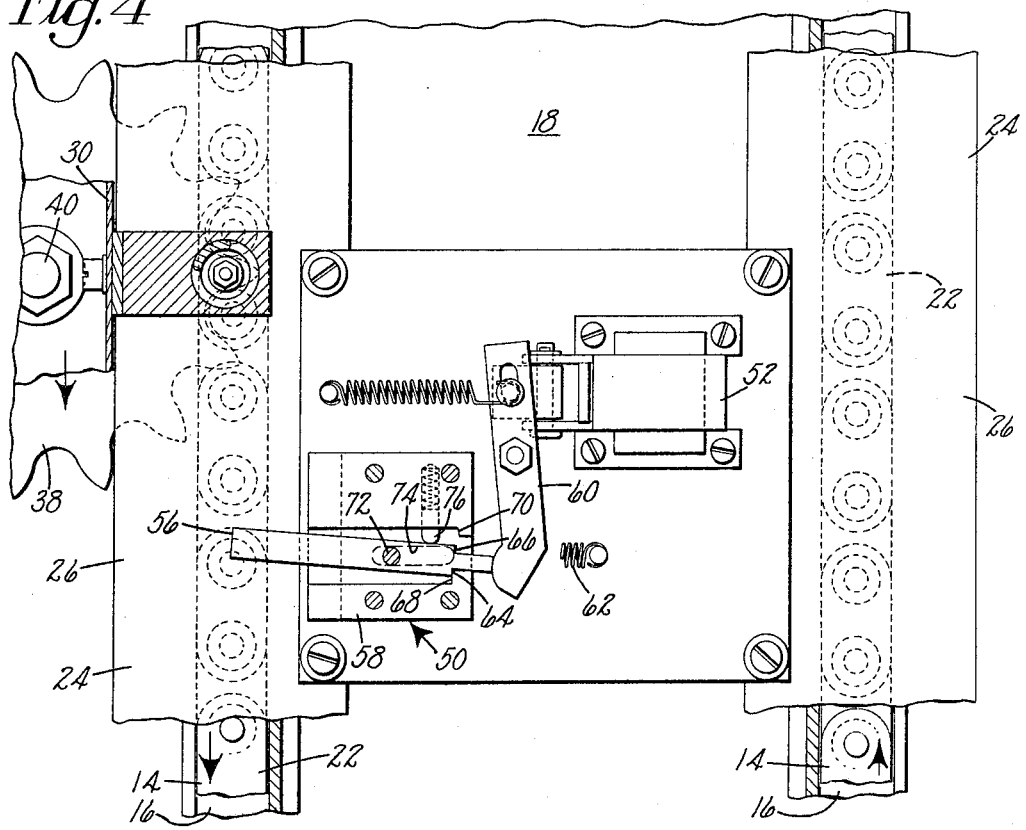
FIG. 4 is a view similar to FIG. 3 illustrating the stop mechanism in the stop position prior to the arrival of a rack.
Figure 5:
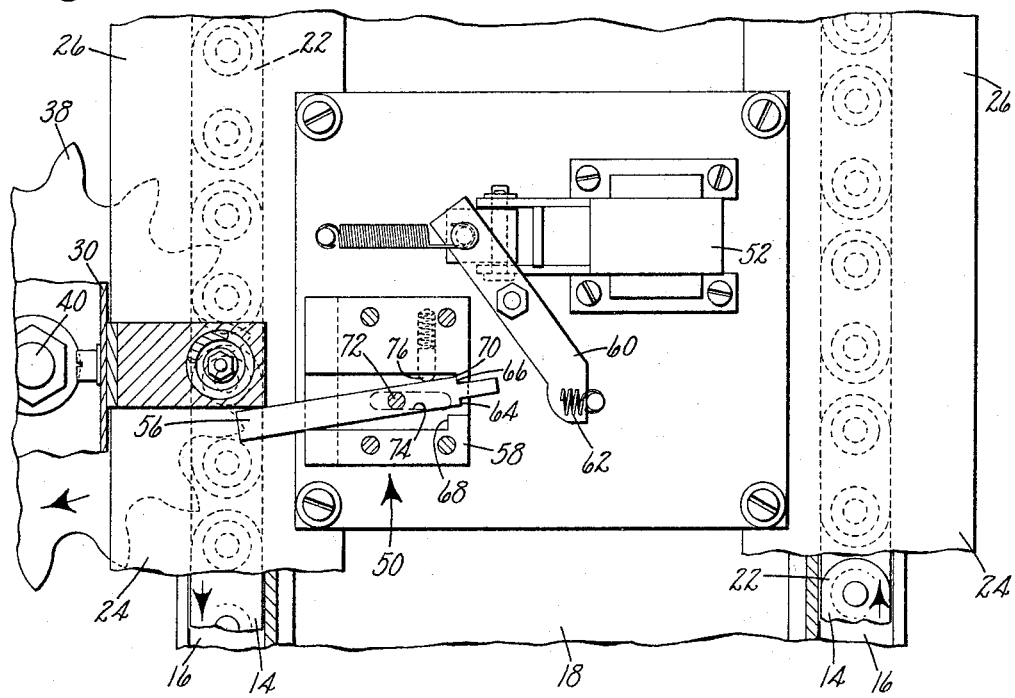
FIG. 5 is a view similar to FIG. 4 illustrating the stop member after a rack has been arrested thereby.

When a rack arriving at the stop position strikes the projecting portion of the arm 56, said portion moves in a downstream direction so that the arm pivots counter-clockwise (as seen in FIGS. 3–5) moving the inner end of the arm to the opposite side of the housing. Shoulder 64 on the arm is thereby released from shoulder 68 of the housing and shoulder 66 on the arm seats behind shoulder 70 of the housing. During such pivotal movement, spring 62 tends to draw the arm toward the retracted position, however, the rack strikes the arm with sufficient velocity that only a small amount of retraction of the arm can occur during the pivotal movement. To allow for the possibility of some small amount of retraction and for another purpose to appear hereinafter, the position of the shoulders 66 and 70 are such that they retain the arm in a second stop position which is disposed slightly rearwardly of the first stop position.

When an operator at the work station removes the arrested rack from the conveyor, the release of the pressure of the rack from the projecting end of the arm 56 allows the plunger 76 to push the shoulder 66 in the opposite end of the arm out from behind the shoulder 70 in the housing, so that the spring 62 returns the arm to the pass position.

The fact that the arm 56, when in the second stop position, is disposed rearwardly of the first stop position eliminates any possibility that when the rack is removed, the shoulders 64 and 68 forming the first stop position can inadvertently become engaged when the inner end of the arm is pivoted back to its original position by the bias plunger 76.

Although in the illustrated embodiment the stop mechanism is actuated by the solenoid 52, it will be apparent that mechanical means may be provided to move the arm to the stop position.

Since certain other obvious changes may be included in the device without departing from the scope of the invention it is intended that all matter contained herein be interpreted in an illustrative and not a limiting sense.

Having thus described my invention what I claim as new and desire to secure by Letters Patent of the United States is:

1. A stop mechanism for use with a conveyor of the type in which article carrying racks are moved between stations, means mounting said stop mechanism adjacent to the conveyor in a position to enable the mechanism to selectively inhibit the progress of the racks carried by the conveyor, said stop mechanism comprising a stop member movable between pass and stop positions, means biasing the stop member to a pass position, first and second latch means for inhibiting movement of the stop member into the pass position, means for biasing the stop member into engagement with the first latch means, means mounting said stop member for movement, in response to engagement thereof by a rack, out of engagement with the first latch means and into engagement with the second latch means, said latch means being so located with respect to each other that upon removal of the rack from engagement with the stop member, the last named biasing means moves the stop member out of engagement with the second named latch means into a position in which the first named biasing means moves the stop member into a pass position, and means for returning the stop member into stop position in engagement with the first latch means.

2. A stop mechanism as defined in claim 1 wherein the stop member comprises an arm movable lengthwise within a housing between a stop position at which position one end of the arm projects into the path of rack travel and the pass position at which position the arm is retracted from the path of rack travel.

3. A stop mechanism as defined in claim 2 wherein the pair of latch means are disposed on opposite sides of said arm.

4. A stop mechanism as defined in claim 3 wherein the first latch means is designed to retain said arm in a first stop position, the second latch means is designed to retain said arm in a second stop position rearwardly of said first stop position.

5. A stop mechanism as defined by claim 1 in which the latch means comprises stop shoulders, one at each side of the stop member and located at different distances from the conveyor, and the stop member has shoulders at each side thereof cooperating with said stop shoulders, and in which the stop member is mounted for lengthwise movement transversely of the conveyor and for pivotal movement whereby the shoulders on the stop member are moved toward one or the other of the stop shoulders.

References Cited by the Examiner

UNITED STATES PATENTS

| | | | |
|---|---|---|---|
| 1,496,444 | 6/1924 | Braley | 104—250 |
| 2,619,916 | 12/1952 | Rainier | 104—172 |
| 3,088,197 | 5/1963 | Cargill | 104—172 |

ARTHUR L. LA POINT, *Primary Examiner.*

F. W. MONAGHAN, D. F. WORTH,
*Assistant Examiners.*